Feb. 7, 1961    S. RUBIN    2,970,567
LITTER CLEANER FOR CAGES
Filed Sept. 2, 1959    5 Sheets-Sheet 4

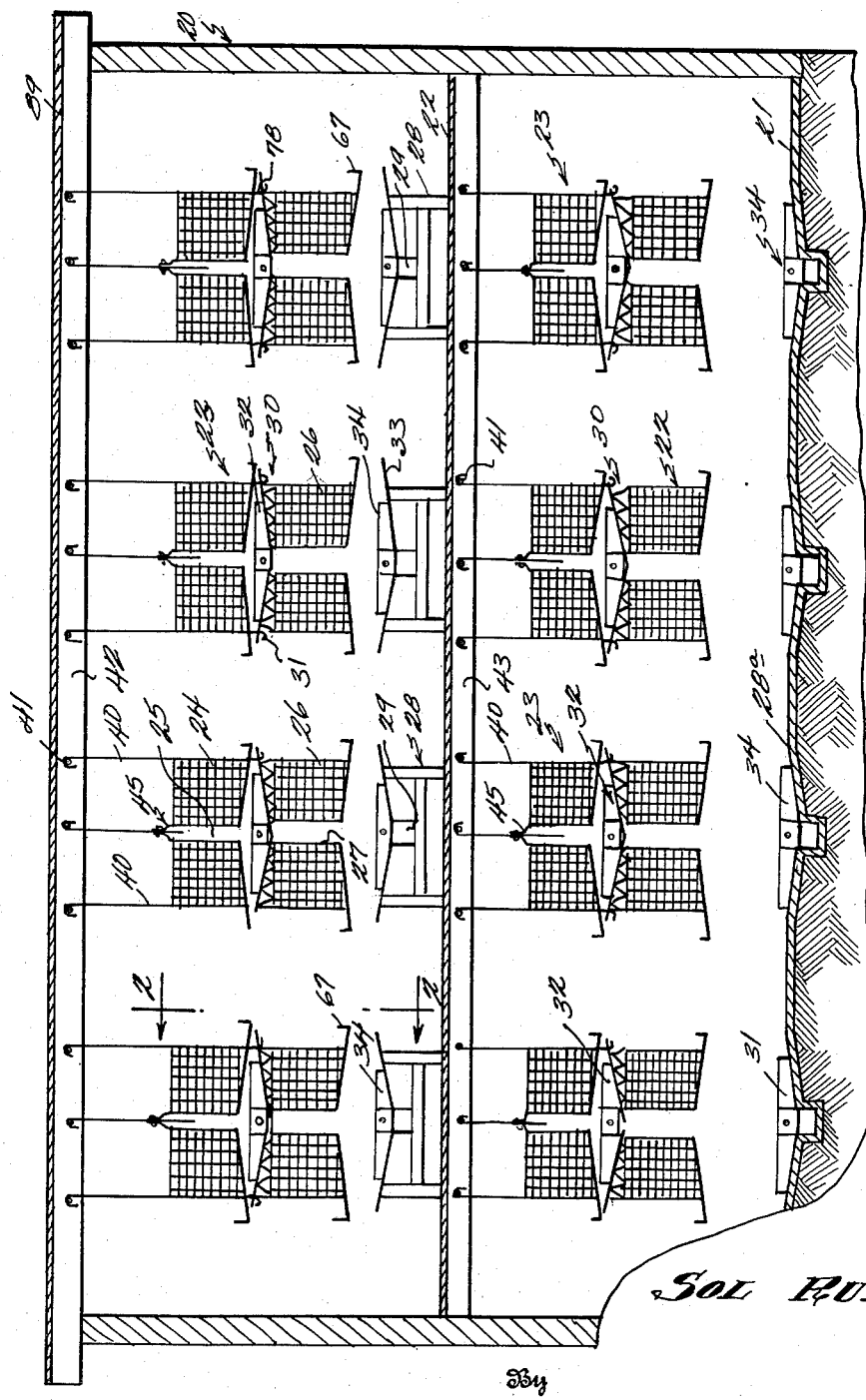

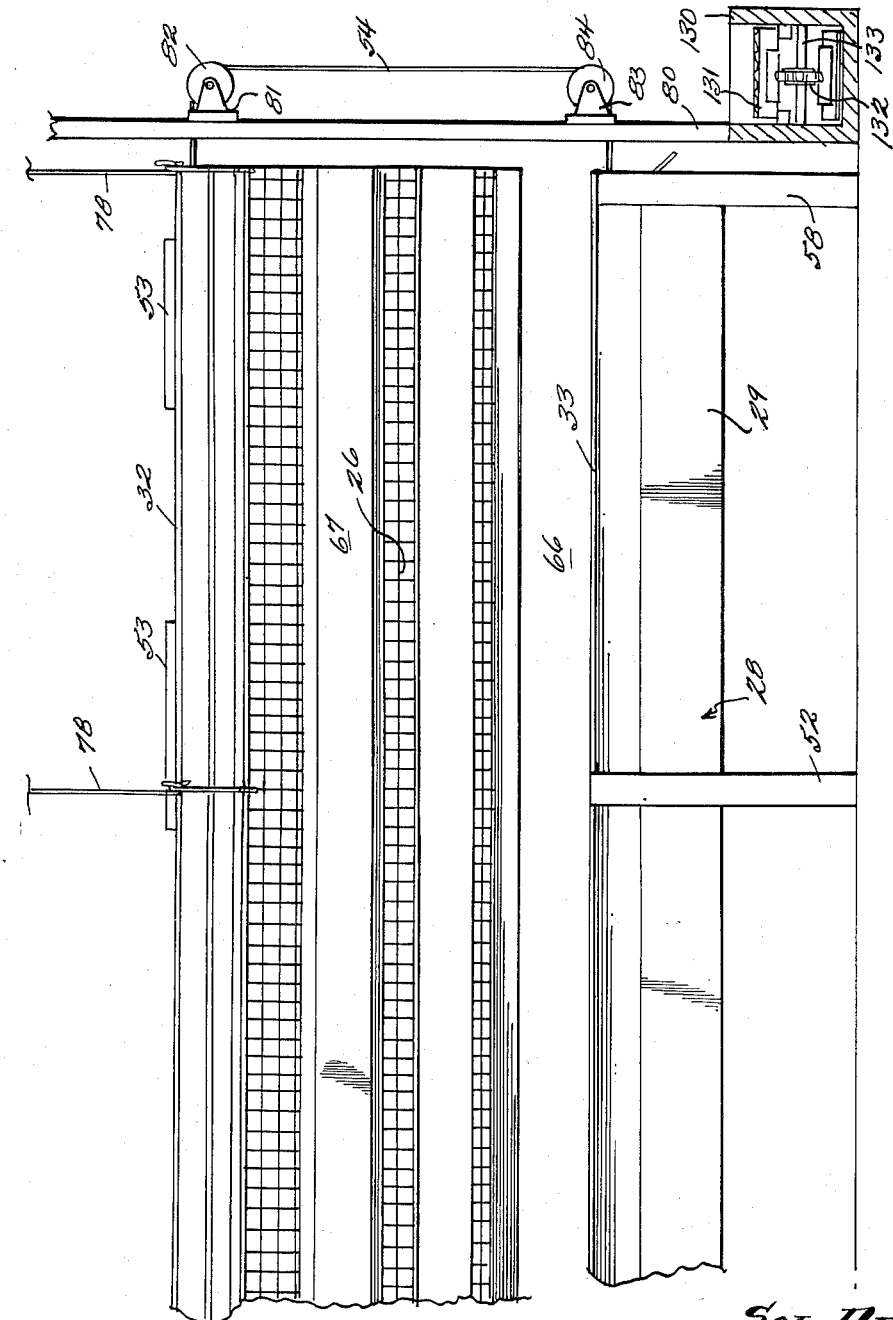

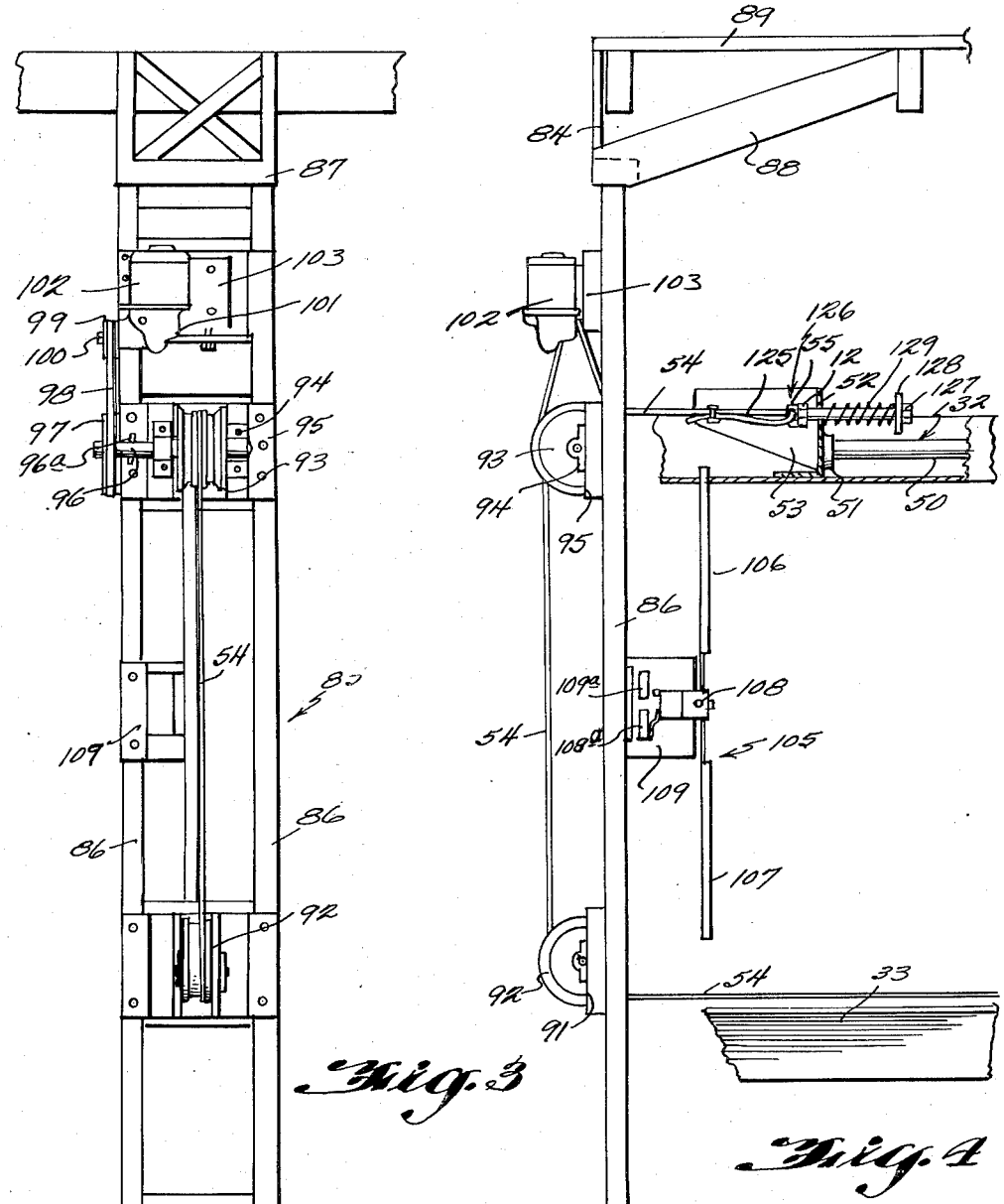

Inventor
SOL RUBIN

By
Kimmel & Crowell
ATTORNEYS

Feb. 7, 1961  S. RUBIN  2,970,567
LITTER CLEANER FOR CAGES
Filed Sept. 2, 1959  5 Sheets-Sheet 5
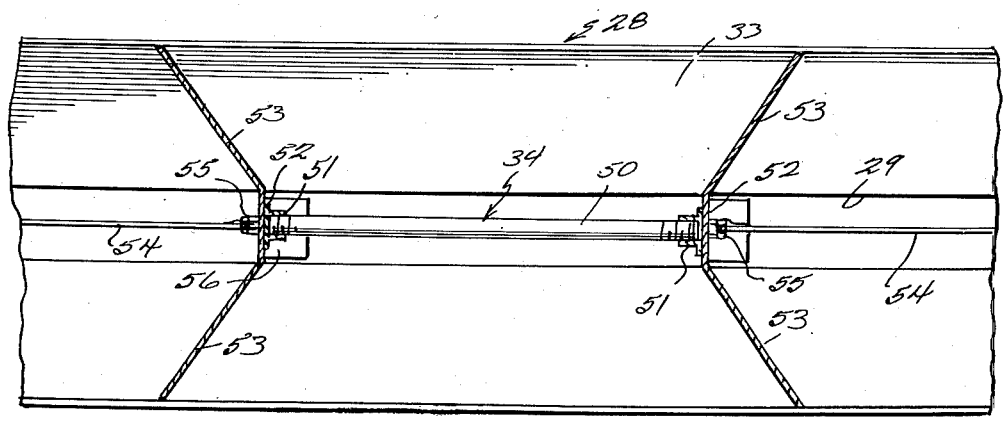
Fig. 6
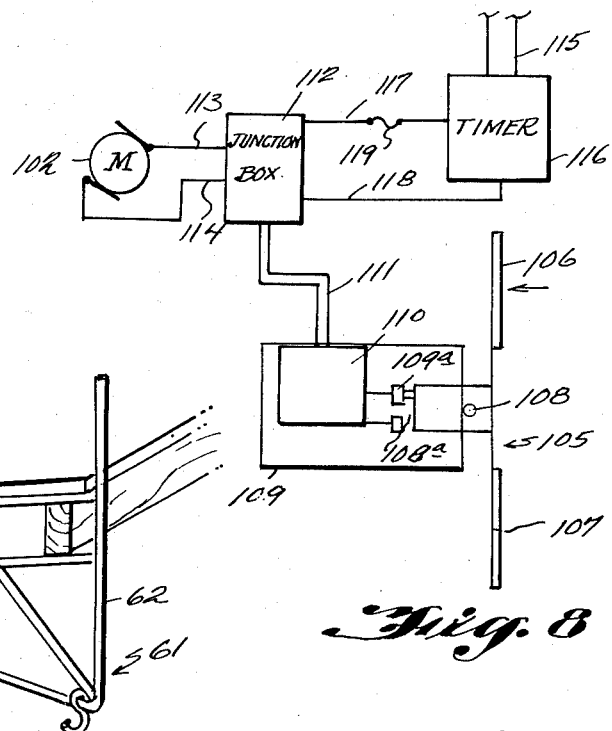
Fig. 7
Fig. 8
Inventor
SOL RUBIN
By
Kimmel & Crowell
ATTORNEYS

United States Patent Office 2,970,567
Patented Feb. 7, 1961

2,970,567

LITTER CLEANER FOR CAGES

Sol Rubin, Farmingdale, N.J.

Filed Sept. 2, 1959, Ser. No. 837,654

6 Claims. (Cl. 119—22)

This invention relates to a litter cleaner for cages, and has particular applicability to an automatic litter cleaner for laying cages for hens.

A primary object of the invention is the provision of a continuously operating reciprocating cleaner blade which is adapted to be positioned beneath a double row of laying cages, of any desired type, but preferably those having mesh bottoms wherein the droppings fall on oppositely disposed inclined plates between which is an opening, through which the droppings may fall, the opening of the lower tier constituting a trough in which the droppings may accumulate. The scraper blade reciprocates continuously along the inclined dropping plates, and the length of the lower trough, conveying the litter or droppings to one end of the trough for disposal.

A further object of the invention is the provision of such a litter cleaner which is motor operated, and provided with means automatically reversing the direction of the motor at the end of the path of travel of the blade, to reverse the travel of the blade.

An additional object of the invention is the provision of such a litter cleaner wherein upper and lower cleaners are provided for a double row of cages, and wherein the blades are oppositely reciprocated, so that one blade is at one end of the path of travel, while the other blade is at the other.

A further object of the invention is the provision of means for disposal of the litter accumulating at an end of the lower trough, it being understood that the litter from the upper cages drops through the opening therebetween into the lower trough, such means preferably taking the form of a continuously operating conveyor belt which carries the litter to a source of disposal.

A still further object of the invention resides in an improved supporting means for the movable scraper blade and is conveying mechanism along the upper tier of cages.

A further and more specific object of the invention resides in the provision of an improved means for hanging or supporting the double cages from an overhead support.

A still further object of the invention resides in the provision of a novel continuously operating scraper and conveyor mechanism, whereby the cages are kept substantially clean and free from litter and droppings at all times.

Still other objects reside in the combination of elements, arrangement of parts, and features of construction, all as will be more fully pointed out hereinafter and disclosed in the accompanying drawings wherein there is shown a preferred embodiment of this inventive concept.

In the drawings:

Figure 1 is a schematic end view partially in elevation and partially in section of a laying plant incorporating upper and lower floors, each floor containing multiple rows of double tier paired cages;

Figure 2 is an enlarged fragmentary side elevational view of an upper double tier of cages showing one end portion of the scraper assembly is association with the support therefor;

Figure 3 is an enlarged end elevational view of the drive mechanism for the scraper assembly of upper and lower tiers, and its supporting mounting, the cages and scraper blades being omitted for the sake of clarity of illustration;

Figure 4 is a side elevational view of the construction of Figure 3 but showing one of the scraper blades at the end of its path of travel;

Figure 6 is a sectional view taken substantially along the line 6—6 of Figure 5, as viewed in the direction indicated by the arrows;

Figure 7 is a fragmentary perspective view of a constructional detail;

Figure 8 is a diagrammatic wiring diagram showing the electrical operating circuits;

Similar reference characters refer to similar parts throughout the several views of the drawings.

Figure 5:
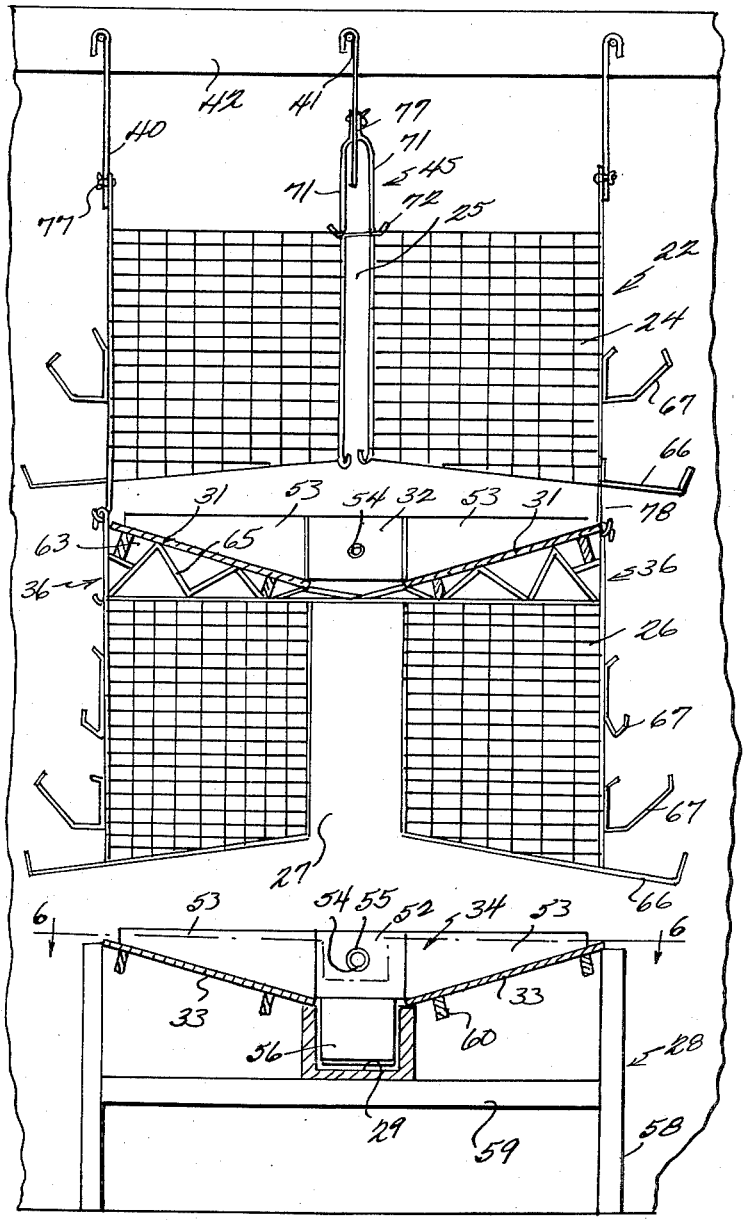
Figure 5 is an enlarged elevational view, partially in section, showing a double tier of cages with its associated upper and lower scraper blades, and the lower droppings trough.

Having reference now to the drawings in detail, and more particularly to Figure 1, there is generally indicated at 20 a building, of any desired type, such as may be conveniently employed for a laying plant. Positioned interiorly of the building 20, which may contain a first floor 21 and a second floor 22, are a plurality of rows of multiple cage units, each generally indicated at 23. Each cage unit 23 comprises a pair of oppositely disposed upper cages 24 having a space 25 therebetween, and a pair of lower cages 26 having a space 27 therebetween. Beneath the lower cages and aligned therewith is a supporting assembly generally indicated at 28 which includes a central trough 29. The tops of the lower cages 26 carry supporting frameworks 30 upon which are mounted oppositely disposed inclined plates 31, having a space therebetween, along which plates reciprocating upper conveyor blades 32 are adapted to move. The lower trough assembly also includes spaced inclined plates 33, overlying the trough 29, and lower scraper blades 34 are adapted to be moved longitudinally along the plates 33, there being provision made, as will be hereinafter described, for cleaning the trough 29.

The lower floor 21 may omit the trough assemblies 28 and to be provided with integrally formed cement troughs 28A, the function of which is substantially identical to that of the troughs 29; similar scrapper blade assemblies 32 and 34 being employed on both floors.

The cages are adpated to be suspended from overhead supports by means of rods 40 which are suitably secured to hanger elements 41 carried by roof beams 42, or floor beams 43 for the upper and lower cage assemblies, respectively, each rod element 40 carrying a hanger element, generally indicated at 45, and also to be more fully described hereinafter, secured to the cage unit.

The upper scraper blade assemblies 32 and the lower scraper blade assemblies 34 are identical, with one exception to be pointed out hereinafter, on both the upper and lower floors. Each scraper assembly comprises an elongated rod or pipe 50 to opposite ends of which are secured pipe caps 51, each pipe cap having secured thereto a central plate-like portion of a scraper blade, which includes two oppositely disposed forwardly inclined wings 53 each of which extends the full extent of its adjacent droppings plate 33. The plates at opposite ends of the pipe 50 are inclined forwardly in the direction of reciprocatory travel of the unit, and are adapted to be moved by means of a cable 54 suitably fastened as at 55 in a manner to be more fully described hereinafter, to a central portion at each end of the scraper assembly. In the case of the lower assemblies 34, a depending skirt 56 is provided for each blade, and is inclined forwardly in the direction of inclination of the wings 53, for the purpose of cleaning out of the lower trough 29, or, in the case of the lower floor, the trough 28A. Obviously, such depending skirts are unnecessary in the scraper blade assemblies 32.

The trough support 28 is best shown in Figure 5, and may be of any desired configuration, but preferably includes supporting uprights 58 which may be of wood, or which may be constructed of channel iron, or similar metal supports. The uprights 58 are connected by transverse supporting members 59 upon which rests the bottom of the trough 29, the latter also being constructed of any suitable material, either wood or sheet metal. The plates 33 incline outwardly from the upper edges of the troughs 29, and are supported on longitudinally extending angle irons or channel beams 60, in the case of metal construction, or alternatively wood stringers.

The uprights 58 are positioned at suitable spaced intervals along the length of the trough, and at either end thereof.

As best shown in Figures 3 and 7, the upper portions of the lower spaced pairs of cages 26 carry supporting frame members, generally indicated at 61, which include upright members 62, and transversely extending members 63, the latter supporting the inclined plates 31. The extremities of the members 62 and 63 are connected by horizontal members 64, which suspends the tops of the lower cage assemblies by four small S hooks 63a. Suitably diagonally disposed reinforcing members 65 extend between the members 63 and 64.

The cage units may be provided with conventional feed troughs 66 and water troughs 67, also as best shown in Figure 5, which may extend the entire length of the cage rows, as is conventionally done.

Figure 9:
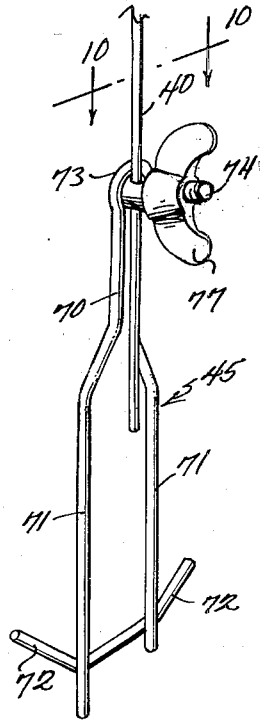
Figure 9 is an enlarged perspective view of one of the hanger elements.
Figure 10:
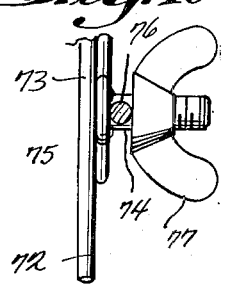
Figure 10 is a sectional view taken substantially along the line 10—10 of Figure 9.

Figures 9 and 10 disclose the hanger assemblies 45 in detail. These hanger assemblies comprise U-shaped members 70, having outwardly bowed legs 71, the lower portions of which are secured to cage engaging hooks 72, the hooks engaging the upper end wires of the wire cages 24, as best shown in Figure 5. The upper portion of the member 70 is provided with a loop 73, which engages about a bolt 74 and is welded thereto, as at 75. The bolt is provided with a transverse bore 76, through which the supporting rods 40 extend, and a wing nut 77 is adapted clampingly to engage the wire supports 40 to hold the hanger assemblies securely thereon. The lower tier of cages is adapted to be supported independently from the upper tier by means of suitably spaced depending hooks 78.

As shown in Figures 2 and 3, one end of each row of cages has positioned adjacent thereto an upright support 80 which carries an upper pulley mounting 81 having a pulley 82 rotatably mounted thereon, and a lower pulley mounting 83 which carries a pulley 84. The cable 54 extends from the upper scraper blade assembly 32 over the pulley 82 and thence downwardly and about the pulley 84 to the lower scraper assembly 34. As best shown in Figures 3 and 4, the other end of each series of cages has an upright member, generally indicated at 85, which extends from floor to ceiling. The member 85 may take the form of spaced apart uprights 86, having a suitable upper plate 87 connected to reinforcing members 88 which, in turn, are secured to the ceiling or roof 89 of the building. A lower transversely extending plate 90 carries a pulley mounting 91 which carries a pulley 92, about which the lower cable flight 54 extends. The cable then extends upwardly to and about a double sheave pulley 93 which is journalled for rotation in a mounting 94 carried by a transverse block or plate 95. A shaft 96 extends outwardly from the sheave 93, and carries a pulley 97, which is driven through a belt 98 from a pulley 99, which is mounted on a shaft 100 which, in turn, extends from a reduction gearing box 101 of an electric motor 102 which is carried by a transversely extending plate 103 bolted or otherwise suitably secured to the uprights 86.

The motor 102 is of the reversible type, and is adapted to be continuously driven for the continuous reciprocation of the upper and lower blade assemblies 32 and 34. Control of the motor is automatically obtained through a lever, generally indicated at 105, which includes an upper arm 106 and a lower arm 107 pivotally mounted as on a pivot 108 to a mounting bracket 109 carried by one of the uprights 86. The arm 105 actuates, in accordance with its position, one of two contacts 108A or 109A, which selectively control the operation of the motor 102.

Figure 8 discloses a schematic wiring diagram, wherein a connection extends from the switch mechanism 110 which carries contacts 108A and 109A, carried by the plate 109, through suitable wiring 111 to a junction box 112. Connections 113 and 114 extend from the junction box to the motor 102 and current is supplied from lines 115 through a conventional timer mechanism and the wires 117 and 118, the former being supplied with a fuse 119, to and through a junction box 112 to the motor 102.

Obviously, in the use and operation of the device when the upper scraper blade assembly 32 is in the position shown in Figure 4 or a little beyond, the upper arm 106 is contacted to reverse the motor and consequently reverse the direction of travel of the blade assembly 32. At this point the lower blade assembly is at the other end of its associated row of cages. This reverse rotation of the motor will continue until the scraper blade assembly 34 strikes the lower arm 107, at which time the direction of travel of the motor will again be reversed.

Referring back to the connection previously mentioned, 55, of the end of the scable 54 to the center portion 52 of the scraper blade, as best seen in Figure 4, this connection comprises a loop 125 in the end of the cable, which is secured through a hole in the head 126 of an elongated bolt 127. The bolt 127 carries a washer 128 which serves to confine a compression spring 129, the other end of which abuts the inner side of the central plate 52, to provide a yieldable resilient connection.

Positioned at either or both ends of the lower trough 29 is a cross trough 130, which contains an endless conveyor belt 131, which includes driving sprockets 132 carried on suitable transversely extending shafts 133. The endless belt construction may be of any desired conventional configuration, and serves to carry the droppings or litter conveyed from the central channel or trough 29 to the end of the device to any suitable location for disposal.

From the foregoing the operation of the device should now be readily understandable.

The continuously operating motor continuously reciprocates the upper and lower blade assemblies from one end of each row of cages to the other, the droppings or litter being thus conveyed continuously toward opposite ends of the unit.

As they are dumped at the ends of the units, it being noted that the droppings from the upper plates 31 fall through the space 27 onto the lower plates 33, they are then carried by the cross conveyor unit 131 to any suitable source of disposal.

Since the operation is continuous, it will be readily apparent that there is never any possible accumulation of litter or droppings at any point throughout the unit.

In the event of mechanical failure, manual operation may be provided by positioning a manual crank on the shaft 96, pins 96A being provided for the reception of such a crank should its use become necessary.

From the foregoing it will now be seen that there is herein provided an improved litter cleaner which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In combination, spaced parallel rows of fowl cages having perforated bottoms through which droppings may pass, a synclinal plate structure for each pair of rows, said plate structure being disposed below said rows with its respective plates underlying said bottoms in spaced relation thereto, the medial portion of said plate structure being in the form of a trough disposed between said rows, a scraper means having a center portion of the shape of and fitted in said trough and inclined wing portions each having an edge slidable along one of said plates, and mechanical means for reciprocating said scraper blade.

2. The structure of claim 1 wherein said scraper means comprises a pipe having a blade unit mounted at each end thereof, each unit being of generally V-shape in plan, with the units facing in opposite directions.

3. The apparatus of claim 1 wherein the means for reciprocating said scraper blade assembly comprises a cable structure connected to said central portion of said scraper means.

4. The apparatus of claim 3 wherein the connection of said cable to said scraper means comprises a bolt extending through said center portion, and a coil spring surrounding said bolt between the head portion thereof and said center portion of the scraper means.

5. The apparatus of claim 1 wherein each of said rows is comprised of tiers of cages, there being an inclined plate structure under each tier, and scraper means for scraping said plate structure, and means for reciprocating said scraper means comprising pulleys provided at each end of said rows, a cable extending over said pulleys, one reach of said cable being connected to the scraper means of the upper tier and the other reach thereof being connected to the scraper means of the adjacent lower tier.

6. The apparatus of claim 1 wherein a transverse conveyor belt is provided at an end of said trough.

References Cited in the file of this patent

UNITED STATES PATENTS

| | | |
|---|---|---|
| 2,383,326 | Lovell | Aug. 21, 1945 |
| 2,448,120 | Petraske | Aug. 31, 1948 |
| 2,675,991 | Waterstreet | Apr. 20, 1954 |
| 2,843,086 | Graham | July 15, 1958 |
| 2,851,990 | Rowland | Sept. 16, 1958 |